April 1, 1969 J. R. HARRIS, JR 3,436,562
SOLID STATE POWER CONTROL CIRCUIT WITH COMPENSATION
FOR LINE VOLTAGE VARIATION
Filed Feb. 5, 1965 Sheet 1 of 2

INVENTOR
John R. Harris Jr.

BY

ATTORNEY

United States Patent Office 3,436,562
Patented Apr. 1, 1969

3,436,562
SOLID STATE POWER CONTROL CIRCUIT WITH COMPENSATION FOR LINE VOLTAGE VARIATION
John R. Harris, Jr., Dallas, Tex., assignor to Hunt Electronics Company, Dallas, Tex., a corporation of Texas
Filed Feb. 5, 1965, Ser. No. 430,541
Int. Cl. H03k *17/08*
U.S. Cl. 307—252
10 Claims

ABSTRACT OF THE DISCLOSURE

There is disclosed a power control circuit for the phase control of power with compensation for line voltage variation wherein the control signal applied for controlling the conduction of a power control switching device is generated by means including a Zener diode for providing a square wave signal of the same frequency as the alternating current supply voltage, a resistor-capacitor network for providing a second signal which is a function of the instantaneous amplitude of the applied alternating current supply voltage, a capacitor which is charged to a voltage that is the difference in the voltage between the square wave signal and the second signal and means responsive to the charge on the capacitor for applying to the power control device the control signal.

---

The present invention relates to apparatus for controlling the effective power applied to a load from a source of alternating current supply voltage and more particularly to improved power control circuitry adapted to compensate for variations in amplitude of the alternating current supply voltage source.

The effective power applied to a load from a source of alternating current supply voltage is often controlled by controlling the conduction time of a switching device connected in series with the load and the alternating current supply voltage. A three electrode device known as the silicon controlled rectifier (SCR) has been used quite extensively in such applications, and circuits examplary of those used in such applications are shown on pages 125–152 of the General Electric SCR Manual, third edition, published in 1964 by the General Electric Company. More recently, a two terminal, multilayer semiconductor device known as the Silicon Symmetrical Switch (SSS) has also been used quite extensively in such applications. Examplary circuits embodying the SSS device are disclosed in United States patent applications, Ser. No. 160,541, filed Dec. 19, 1961, now Patent No. 3,188,487 and Ser. No. 184,841, filed Apr. 3, 1962, now Patent No. 3,188,490, both of which are assigned to the assignee of the present invention.

The above mentioned circuits possess a high degree of utility and, as a consequence, have been accorded a substantial amount of commercial acceptance. Thus, both the silicon controlled rectifier and the two terminal multilayer devices have been used in such applications as light controls, motor controls and similar power control applications.

In some instances, the amplitude of the applied alternating current supply voltage may vary over relatively wide ranges. It is desirable that the power control circuitry be capable of sensing and compensating for these amplitude changes in order that the effective power applied to the load will remain substantially constant. Although such circuitry has been provided for use with the silicon controlled rectifier and similar gated devices, until the present invention such a need was not satisfied with respect to the diode devices.

The present invention provides a power control circuit utilizing a diode device as a switching element with compensation for line voltage variations. Although the present invention is especially adapted for use with such diode devices, it can also advantageously be utilized with gated devices.

In accordance with the principles of the present invention, a semiconductor device having at least two electrodes is connected by the two electrodes in series with the load and a source of alternating current supply voltage. A firing circuit for generating a control signal of a character to cause the semiconductor device connected in series with the load to switch from the normally high impedance state to the low impedance state is also provided. The firing circuit is preferably connected in shunt with the first mentioned semiconductor device. The firing circuit of the present invention comprises a capacitor and a semiconductor diode device which can be switched from the normally high impedance state to a low impedance state, the diode device being connected at one terminal to the capacitor. There is also provided means for limiting the voltage appearing at a first juncture point to a first voltage level in excess of the breakover voltage of the semiconductor diode device and means for applying to a second juncture point a voltage less than the breakover voltage of the diode device. The voltage applied to the second juncture point is one which varies as a function of the instantaneous amplitude of the alternating current supply voltage. The capacitor is connected between the two juncture points such that it will be charged to a voltage which is a function of the vectorial sum of the instantaneous voltages appearing at the two juncture points. When the capacitor is charged to a voltage at least equal to the breakover voltage of the diode device, the diode device switches to its low impedance state, applying a signal to the first semiconductor device to cause the first semiconductor device to switch to its low impedance state. Suitably, a variable resistance is connected in series with the capacitor between the two juncture points for varying the rate at which the capacitor is charged.

Further, in accordance with a preferred embodiment of the invention, the diode device is a symmetrical device capable of being switched to the low impedance state in either direction and the means for establishing the maximum voltage level at the first juncture point is a double anode Zener diode. Also, in accordance with the preferred embodiment of the present invention, a voltage divider network is utilized for producing and applying to the second juncture point the signal which varies as a function of the instantaneous amplitude of the applied signal voltage. Best results have been obtained by providing a reactance means in the voltage divider network for purposes of causing the signal appearing at the second juncture point to be of different phase than the applied voltage. In accordance with one specific example of the invention, the reactance comprises a capacitor connected in shunt with one of the resistors of the voltage divider network.

The novel features of the present invention are set forth with greater particularity in the appended claims. Many objects and advantages of the invention will, however, become apparent to those skilled in the art as the following detailed description of the same unfolds when taken in conjunction with the appended drawings wherein like reference numerals denote like parts and in which:

Figure 1:
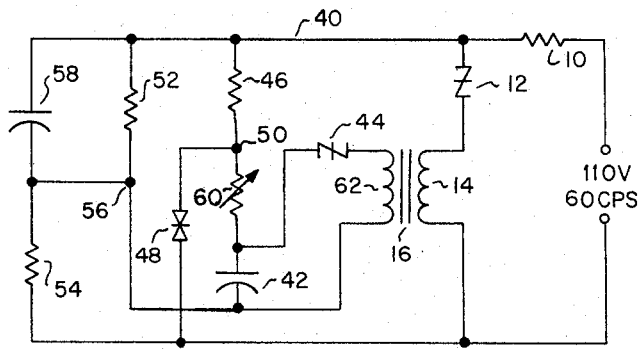
FIGURE 1 is a schematic diagram of a preferred embodiment of the invention wherein a diode device is connected in series with the load and a source of alternating current supply voltage.

Turning now to FIGURE 1 of the drawings, there is shown a load 10 connected in series with switching device 12 and a source of alternating current supply voltage. Also connected in series with the load 10 and the device 12 is the secondary winding 14 of a transformer 16. The transformer 16 is utilized for applying to the device 12 a control signal to cause the device 12 to switch from the normally high impedance state to the low impedance state.

Figure 2:
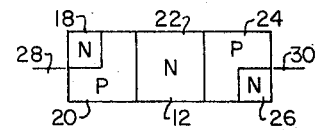
FIGURE 2 illustrates the structure of a preferred type of diode switching device used in practicing the invention.

The device 12 of FIGURE 1 is suitably of the configuration shown in FIGURE 2, and can be seen to comprise five layers 18, 20, 22, 24 and 26, contiguous layers being of opposite type conductivity. It will be observed that the lead 28 contacts both of the regions 18 and 20 and the terminal 30 contacts both the regions 24 and 26. The regions 18 and 26 are each of reduced size and suitably offset from one another. The device 12 shown in FIGURE 2 can therefore be seen to be functionally equivalent to two oppositely poled four layer diodes.

Figure 3:
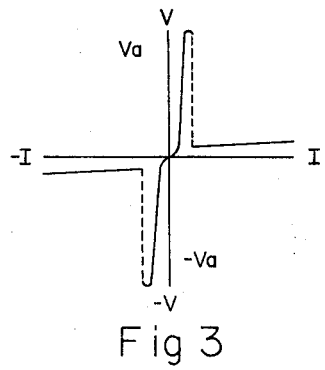
FIGURE 3 is a curve illustrating the voltage current characteristics of the device of FIGURE 2.

The switching characteristics of the device shown in FIGURE 2 are as illustrated in FIGURE 3. Thus, the device of FIGURE 2 will normally exhibit a high impedance to the flow of current in either direction. However, upon application of a control signal of required character and proper polarity, the device will be switched from a normal high impedance state to a quasi stable low impedance state. The direction in which the device is switched to the low impedance state will be dependent upon the polarity of the control signal. Once the device switches to the low impedance state, it will remain in the low impedance state so long as holding current flows through the devfce. However, once holding current ceases to flow through the device, the device will return to the high impedance state. The device as shown in FIGURE 2 can either be switched from the high impedance state to the low impedance state by applying a voltage across the device whose amplitude is greater than the breakover voltage of the device or a signal whose rate of rise is sufficiently fast to cause the device to switch to the low impedance state. Best results have, however, been obtained utilizing a device which is switched to the low impedance state by exceeding its breakover voltage.

Turning again to FIGURE 1 of the drawings, there is provided a firing circuit designated generally by the reference character 40. The firing circuit can be seen to comprise a capacitor 42 and a diode device 44. It will be observed that one terminal of the diode device 44 is connected to one terminal of the capacitor 42. The device 44 is also suitably as shown in FIGURE 2 of the drawings. However, in practicing the invention, the device 12 is one whose breakover voltage is substantially in excess of the maximum instantaneous amplitude of applied alternating current supply voltage whereas the diode device 42 is one whose breakover voltage is substantially less than the maximum instantaneous amplitude of the supply voltage.

There is also provided a resistor 46 and a double Zener diode 48. Resistor 46 and double Zener diode 48 are connected in series across the series circuit comprising the diode 12 and the secondary winding 14 of transformer 16. The Zener diode 48 and resistor 46 cooperate to limit the potential appearing at juncture point 50 to a desired voltage, dependent upon the characteristics of the device 48. The maximum potential signal appearing at juncture point 50 must be greater than the breakover voltage of the diode device 44.

A voltage divider network comprising a resistor 52 and resistor 54 is also provided. The voltage divider network is also connected in shunt with the series circuit comprising the device 12 and the secondary winding 14. The potential appearing at the juncture point 56 will therefore vary as a function of the instantaneous amplitude of the applied alternating current supply voltage. For reasons that will become apparent as the description of the present invention unfolds, a capacitor 58 is preferably connected in shunt with the resistor 52, and the resistor 52 is suitably of substantially greater resistance than the resistor 54.

The capacitor 42 is connected at one terminal to the juncture point 56. The other terminal of the capacitor 42 is connected to the juncture point 50, suitably through a variable resistor 60. Capacitor 42 will therefore be charged by a voltage which is a function of the vectorial sum of instantaneous voltages appearing at the juncture point 50 and the juncture point 56, with the rate at which the capacitor is charged being controlled by the resistance of the variable resistor 60.

In accordance with the preferred embodiment of the invention disclosed in FIGURE 1, one terminal of the diode device 44 is connected to the juncture point between the resistor 60 and the capacitor 42, the other terminal being connected through the primary winding 62 of transformer 16 to juncture point 56. When the capacitor 42 is charged to a voltage equal to the breakover voltage of the device 44, the device 44 will switch from its normally high impedance state to a low impedance state, in the fashion illustrated in FIGURE 3 of the drawings, providing a low impedance discharge path for the capacitor 42 through the primary winding 62 of transformer 16. Since the discharge path of the capacitor 42 has a very low resistance, capacitor 42 will discharge quite abruptly, including a high voltage pulse in the secondary winding 14 of the transformer 16. The voltage induced in the secondary winding 14 of the transformer 16 will be of a character to cause the device 12 to switch to its low impedance state and remain in the low impedance state for the remainder of the half cycle of alternating current supply voltage. Near the end of the half cycle of alternating current supply voltage, the current flowing through the device 12 will become less than the holding current required to maintain the device in the low impedance state and the device 12 will return to its normal high impedance state.

It will be noted that once the capacitor 42 has discharged, the device 44 will also return to its normally high impedance state. Once the device 12 switches to its low impedance state, the voltage applied to the firing circuit will be quite small, much less than the breakover voltage of device 44. By connecting the firing circuit in shunt with device 12, the possibility of the capacitor 42 again charging to a level sufficient to switch device 44 is prevented, thereby preventing additional high voltage pulses being generated during the half cycle of applied line voltage.

Figure 4:
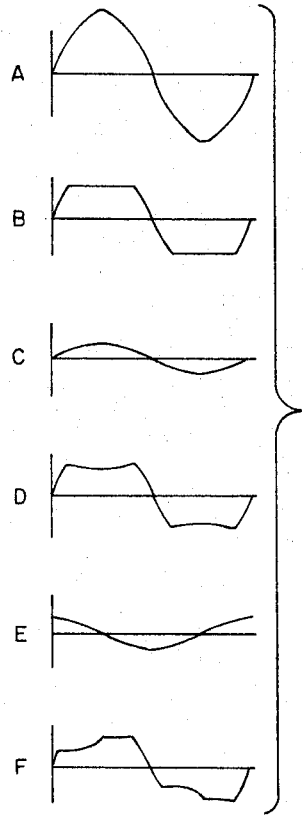
FIGURE 4 shows the wave forms present at selected points in the circuit of FIGURE 1.

The detailed operation of the circuitry will now be explained in conjunction with the curves of FIGURE 4. Thus, the applied alternating current supply voltage will be a sine wave as shown in curve A. The signal appearing at juncture point 50 will be as shown in curve B and will be a clipped sine wave whose peak amplitude is greater than the breakover voltage of the device 44. Thus, the double anode Zener diode 48 is of conventional type which exhibits a very high impedance to the flow of current until the Zener voltage of the diode is reached, at which time the diode 48 will commence to conduct. The resistor 46 functions as a voltage dropping resistor to limit the current flowing through the Zener diode 48.

If the capacitor 58 is not provided, the potential appearing at juncture point 56 will be as shown in curve C and will be a sine wave signal substantially in phase with the applied supply voltage but of reduced amplitude, the instantaneous amplitude of the signal C being a function of the relative resistances of the resistors 52 and 54. The maximum instantaneous voltage appearing at juncture point 56 is suitably less than $V_z - V_{bo}$ where $V_z$ is the Zener voltage of the device 48 and $V_{bo}$ is the breakover voltage of the device 44. The voltage appearing between juncture point 50 and juncture point 56 will therefore be equal to the vectorial sum of the signal shown in curve B and the signal shown in curve C or substantially shown in curve D. Observing curve D, it will become apparent that correction provided at either high or low power settings will be quite insignificant, although a substantial correction will be provided for half power settings.

The capacitor 58 is connected in shunt with the resistor 52, causing the potential appearing at juncture point 56 to lead the applied signal voltage as shown in curve E. The potential appearing between juncture point 50 and juncture point 56 will then be as shown in curve F. If the voltage appearing at juncture point 56 is caused to lead the applied voltage, substantially better compensation is obtained for the lower power settings. It will become apparent, in view of the above, that by controlling the phase relationship between the signal appearing at juncture point 56 and the applied line voltage, excellent compensation can be obtained over particular ranges of loads, although not over the entire power control range of 0% to 95% of which the control is capable.

Figure 5:
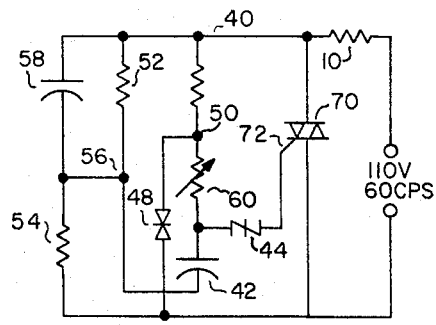
FIGURE 5 is a schematic diagram in accordance with a second embodiment of the invention wherein the gated device is connected in series with the load and supply voltage.

As mentioned previously, the principles of the present invention can also be utilized in power control circuitry which utilizes a gated device for controlling the power through the load. Such an embodiment of the invention is shown in FIGURE 5 of the drawings. FIGURE 5 can be seen to be substantially identical to FIGURE 1 in all respects except that the gated device 70 having a gate electrode 72 is connected in series with the load 10 for controlling the effective power through the load. The gated device 70 is suitably a symmetrical device of the type known as the Triac. The Triac is a complex device having only one gate electrode but which can be switched from a normally high impedance state to a low impedance state in either direction, the direction in which switching occurs being dependent upon the polarity of the control signal applied to the gate electrode. Since a gate electrode is utilized for applying the control signal to the switching device connected in series with the load, transformer 16 is not required and, accordingly, the diode device 44 is connected directly between the capacitor 42 and the gate electrode 72 of the device 70.

In accordance with one specific example of the invention utilizing the circuitry of FIGURE 1, the following components were utilized:

Diode device 12 _____. Hunt Electronics Company SSS device 200 volts breakover.
Device 44 _____. Hunt Electronics Company SSS device 50 volts breakover.
Device 48 _____. Double Zener diode with Zener voltage of 75 volts.
Capacitor 42 _____ 0.1 microfarad 200 volts.
Capacitor 58 _____ 0.047 microfarad 400 volts.
Resistor 46 _____ 5,600 ohms.
Resistor 52 _____ 15,000 ohms.
Resistor 54 _____ 2,200 ohms.
Resistor 60 _____ 0–25,000 ohms.
Transformer 16 _____ Turns ratio 1:4.

Figure 6:
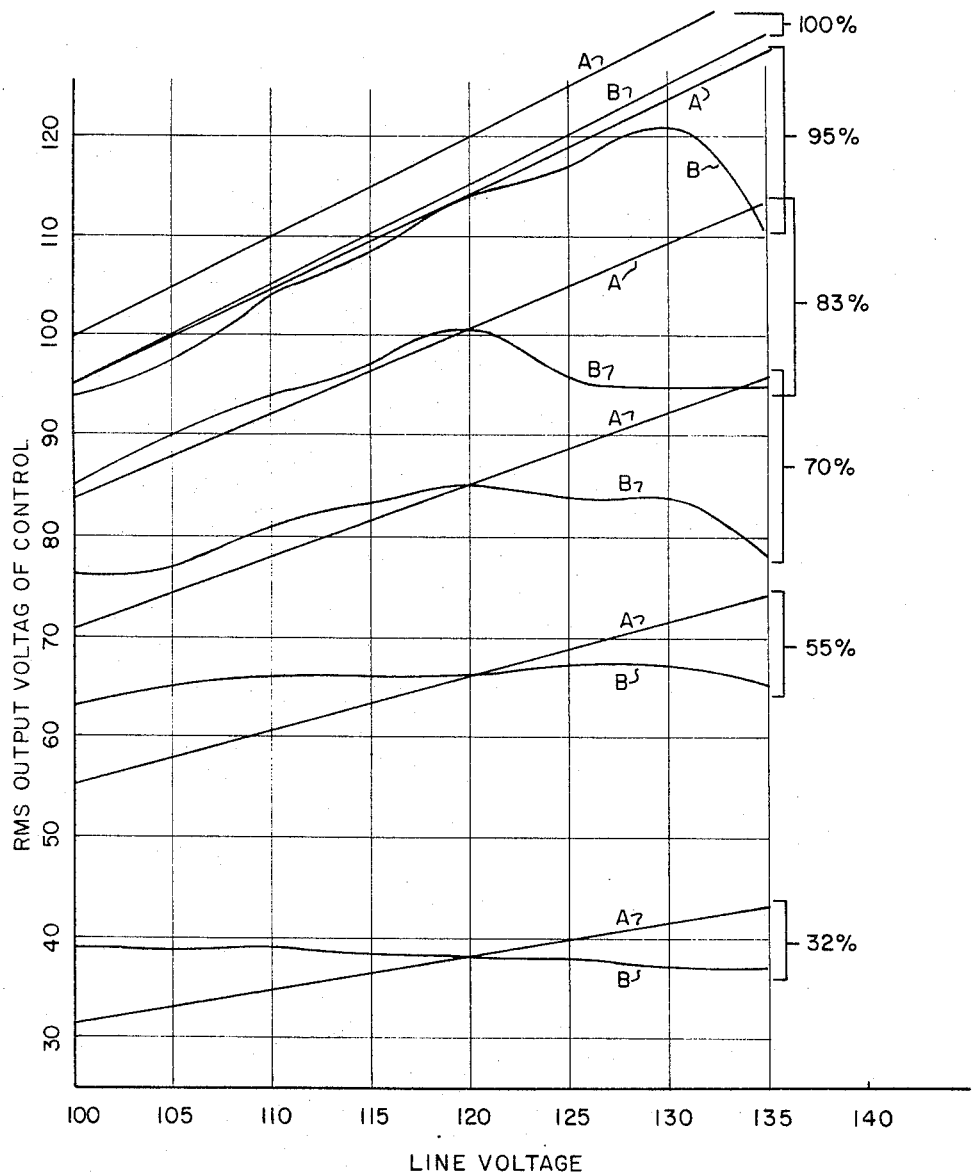
FIGURE 6 is a group of wave forms illustrating the control characteristics obtained using one specific example of the invention.

In FIGURE 6 of the drawings, there are shown curves A and B comparing the RMS output voltage of a control according to FIGURE 1 utilizing the above specified components with an ideal auto transformer respectively for various power settings. In the curves, 120 volts the normal line voltage, but the RMS voltage output is shown for various power settings as the line voltage varies from 100 to 135 volts. As shown, a power setting of 32% would provide an RMS output voltage of 38 volts for a line voltage of 120 volts. The power control of the present invention maintains this voltage plus or minus 1 volt over the entire voltage range whereas if an auto transformer were used, the output voltage would vary plus 5 volts minus 6.5 volts. At a power setting of 55%, corresponding to an RMS output voltage of 66 volts for a line voltage of 120 volts, the power control of the present invention maintains the desired voltage plus or minus 1 volt over a voltage range of 105 to 135 volts and was minus 3 volts at 100 volts line voltage. Utilizing an ideal auto transformer, on the other hand, the output voltage error would not vary from a minus 11 volts to a plus 8 volts. For a power setting of 70%, corresponding to an RMS output voltage of 85 volts, the power control of the present invention held the proper voltage within a tolerance of minus 9 volts over the entire range, was only 4 volts low at a voltage of 110 volts. and was only 1 volt low at a voltage of 130 volts. By contradistinction, an ideal output using an auto transformer, the RMS output voltage would vary from 70 to 96 volts or minus 15 volts plus 11 volts from that desired. At a power setting of 95%, corresponding to an RMS output voltage of 114 volts, the RMS output voltage of the control corresponds vary closely to RMS output voltage of the ideal auto transformer for line voltages less than 120 volts. At line voltages above 120 volts, the power control of the present invention provides substantially improved results over the auto transformer. At 100% power, the power control of the present invention is necessarily low, reflecting the fact that approximately 96% maximum power is the maximum output of the power control.

From the above, it will be readily apparent that the present invention provides an improved power control circuit which effectively compensates for line voltage variations. Many changes and modifications to the invention will become obvious to those skilled in the art in view of the foregoing description, which is intended to be illustrative rather than limiting of the invention defined in the claims.

What I claim is:

1. A voltage regulated power control for controlling the effective power applied to a load from a source of alternating supply voltage comprising a first semiconductor device having a first electrode and a second electrode, said device normally exhibiting a high impedance between said first and second electrodes and capable of being excited to a quasi stable low impedance state in at least one direction when a control signal is applied thereto and remaining in said low impedance state so long as holding current flows through said device between said first and second electrodes, means for connecting said first semiconductor device by said first and second electrodes in series with a load and a source of alternating current supply voltage, a firing circuit for producing and applying to said first semiconductor device a control signal of a character to cause said first semiconductor device to switch to the low impedance state, said firing circuit comprising a capacitor, semiconductor diode device connected at one terminal to said capacitor, said diode device normally exhibiting a high impedance state but being switched to a quasi stable low impedance state responsive to said capacitor being charged to a voltage at least equal to the breakover voltage of said semiconductor diode device and remaining in said low impedance state so long as holding current flows through said device, a first juncture point, a second juncture point, means connecting said capacitor between said first and escond juncture points whereby said capacitor is charged to a voltage which is a function of the sum of the instantaneous voltages appearing at said first and second juncture points, means for limiting the voltages appearing at said first juncture point to a first voltage level, said first voltage level being in excess of the breakover voltage of said semiconductor diode device, means for applying to said second juncture point a voltage less than the breakover voltage of said semiconductor diode device and which varies as a function of the instantaneous amplitude of the aternating current supply voltage, and means connecting the other electrode of said semiconductor diode device to apply to said first semiconductor device a signal of a character to cause said first semiconductor device to switch to the low impedance state responsive to said semiconductor diode device switching to the low impedance state.

2. A voltage regulated power control as defined in claim 1 further including a resistive element connected in series with said capacitor between said first and second juncture points for controlling the rate at which said capacitor is charged.

3. A voltage regulated power control as defined in claim 1 wherein said means for applying to said second juncture comprises a voltage divider network.

4. A voltage regulated power control as defined in claim 1 wherein said means for limiting the voltage appearing at said first juncture point comprises a Zener diode.

5. A voltage regulated power control as defined in claim 3 wherein said voltage divider network comprises a first resistor connected at one terminal to said second juncture point, a second resistor connected at one terminal to said second juncture point and a reactance means connected in shunt with one of said resistors.

6. A voltage regulated power control as defined in claim 5 wherein said reactance means is a capacitor.

7. A voltage regulated power control as defined in claim 1 wherein said last named means comprises a transformer having an input winding and an output winding, means connecting said input winding in series with said semiconductor diode device and means connecting said output winding in circuit with said first semiconductor device.

8. A voltage regulated power control as defined in claim 7 wherein said first semiconductor device is a second diode device and wherein the output of said transformer is connected in series with said second diode device.

9. A voltage regulated power control comprising first and second semiconductor diode devices each having two electrodes, each said device normally exhibiting a high impedance between said two electrodes and capable of being switched to a quasi stable low impedance state in at least one direction responsive to the voltage across said two electrodes being at least equal to the breakover voltage of the device and remaining in the low impedance state so long as holding current flows, a transformer having input and output windings, means connecting said output winding in series with said first device, means for connecting the series circuit comprising said output winding and said first device in series with a load and a source of alterating current supply voltage, a first branch circuit comprising a first resistor and a Zener diode connected in series, a second branch circuit comprising a second resistor and a third resistor connected in series, said second resistor being of greater resistance than said third resistor, a capacitor connected in shunt with said second resistor, means connecting said first and second branch circuits in shunt with said series circuit comprising said first device and said output winding, means connecting a second capacitor and a variable resistor in series between the juncture of said Zener diode and said first resistor and the juncture of said second and third resistors, and means connecting the second diode device and the input winding of said transformer in series across the second capacitor, said first diode device having a breakover voltage greater than the maximum instantaneous voltage of said supply voltage and said second device having a breakover voltage less than the maximum instantaneous voltage of said supply voltage, the Zener voltage of said Zener diode being greater than the breakover voltage of said second diode device.

10. A voltage regulated power control for controlling the effective power applied to a load from a source of alternating current supply voltage comprising a first semiconductor device having a first electrode and a second electrode, said device normally exhibiting a high impedance between said first and second electrodes and capable of being excited to a quasi stable low impedance state in at least one direction when a control signal is applied thereto and remaining in said low impedance state so long as holding current flows through said device between said first and second electrodes, means for connecting said first semiconductor device by said first and second electrodes in series with a load and a source of alternating current supply voltage, a firing circuit connected in shunt with said first semiconductor device for producing and applying to said first semiconductor device a control signal of a character to cause said first semiconductor device to switch to the low impedance state, said firing circuit comprising a capacitor, a semiconductor diode device connected at one terminal to said capacitor, said diode device normally exhibiting a high impedance state but being switched to a quasi stable low impedance state responsive to said capacitor being charged to a voltage at least equal to the breakover voltage of said semiconductor diode device and remaining in said low impedance state so long as holding current flows through said device, a first juncture point, a second juncture point, means connecting said capacitor between said first and second juncture points whereby said capacitor is charged to a voltage which is a function of the sum of the instantaneous voltages appearing at said first and second juncture points, means for limiting the voltage appearing at said first juncture point to a first voltage level, said first voltage level being in excess of the breakover voltage of said semiconductor diode device, means for applying to said second juncture point a voltage less than the breakover voltage of said semiconductor diode device and which varies as a function of the instantaneous amplitude of the alternating current supply voltage, and means connecting the other electrode of said semiconductor diode device to apply to said first semiconductor device a signal of a character to cause said first semiconductor device to switch to the low impedance state responsive to said semiconductor diode device switching to the low impedance state.

References Cited

UNITED STATES PATENTS 3,210,641 10/1965 Hutson _____ 321—6
3,346,874 10/1967 Howell _____ 307—88.5

JOHN S. HEYMAN, Primary Examiner.

J. D. FREW, Assistant Examiner.

U.S. Cl. X.R.

307—258, 287, 305, 324